United States Patent [19]

Soeffker, deceased et al.

[11] Patent Number: 5,027,597
[45] Date of Patent: Jul. 2, 1991

[54] APPARATUS FOR STORING PROPELLANT IN A SATELLITE

[75] Inventors: Eduard Soeffker, deceased, late of Berlin; by Klaus Soeffker, heir, Berlin; by Susanne Pattison, nee Soeffker, heir; by Bettina Soeffker, heir, both of Achim, all of Fed. Rep. of Germany

[73] Assignee: ERNO-Raumfahrttechnik GmbH, Bremen, Fed. Rep. of Germany

[21] Appl. No.: 392,194

[22] Filed: Aug. 9, 1989

[30] Foreign Application Priority Data

Aug. 9, 1988 [DE] Fed. Rep. of Germany ....... 3826919

[51] Int. Cl.$^5$ ............................ F02K 9/50; B64G 1/26
[52] U.S. Cl. ......................................... 60/243; 60/259; 244/172
[58] Field of Search ................. 60/233, 243, 257, 259, 60/263; 244/172, 169

[56] References Cited

U.S. PATENT DOCUMENTS

| | | | |
|---|---|---|---|
| 3,070,330 | 12/1962 | Escher | 60/257 |
| 3,167,912 | 2/1965 | Ledwith | 60/263 |
| 3,170,290 | 2/1965 | Webb | 60/257 |
| 3,257,800 | 6/1966 | Lawrence | 60/257 |
| 4,489,745 | 12/1984 | Netter et al. | 137/209 |
| 4,923,152 | 5/1990 | Barkats | 60/257 |

Primary Examiner—Leonard E. Smith
Assistant Examiner—John A. Savio, III
Attorney, Agent, or Firm—W. G. Fasse; D. H. Kane, Jr.

[57] ABSTRACT

An arrangement for the supply of propellant for the propulsion systems of a satellite has a main fuel tank, a main oxidizer tank and an additional or auxiliary oxidizer tank. The auxiliary oxidizer tank becomes effective when the oxidizer in the main tank has been used up at the end of the useful life of the satellite. At that time the additional oxidizer is used to bring the satellite into a retirement orbit out of the way, so to speak, to reduce the crowding in the range of desirable orbits. For this purpose, the emptiness of the main oxidizer tank is sensed by a sensor for providing a control signal which closes the main supply line, thereby switching on the auxiliary tank for propelling the satellite into the retirement orbit.

13 Claims, 2 Drawing Sheets

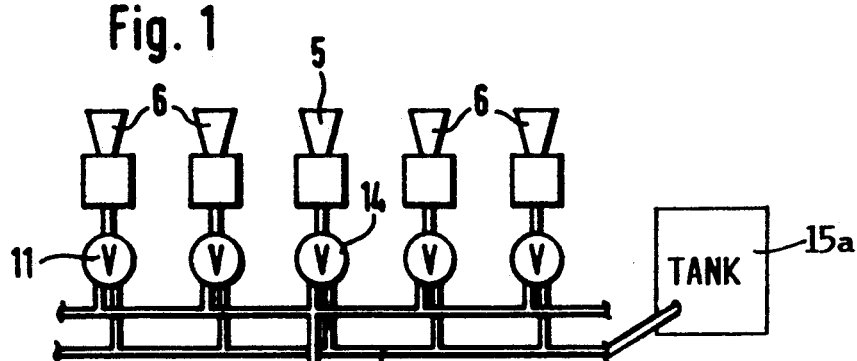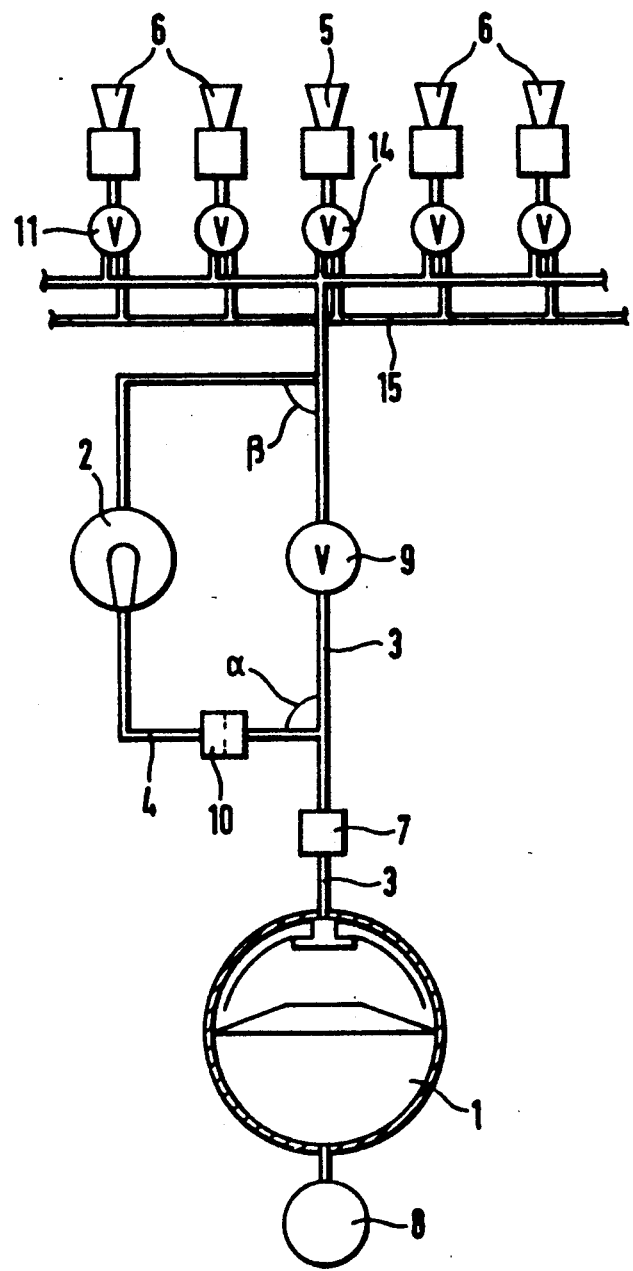

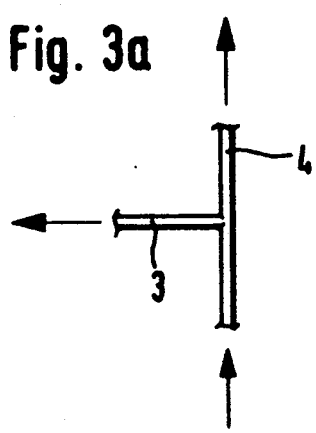
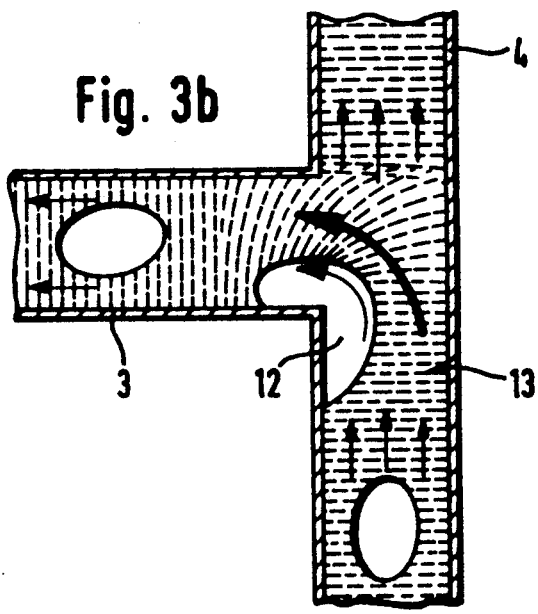
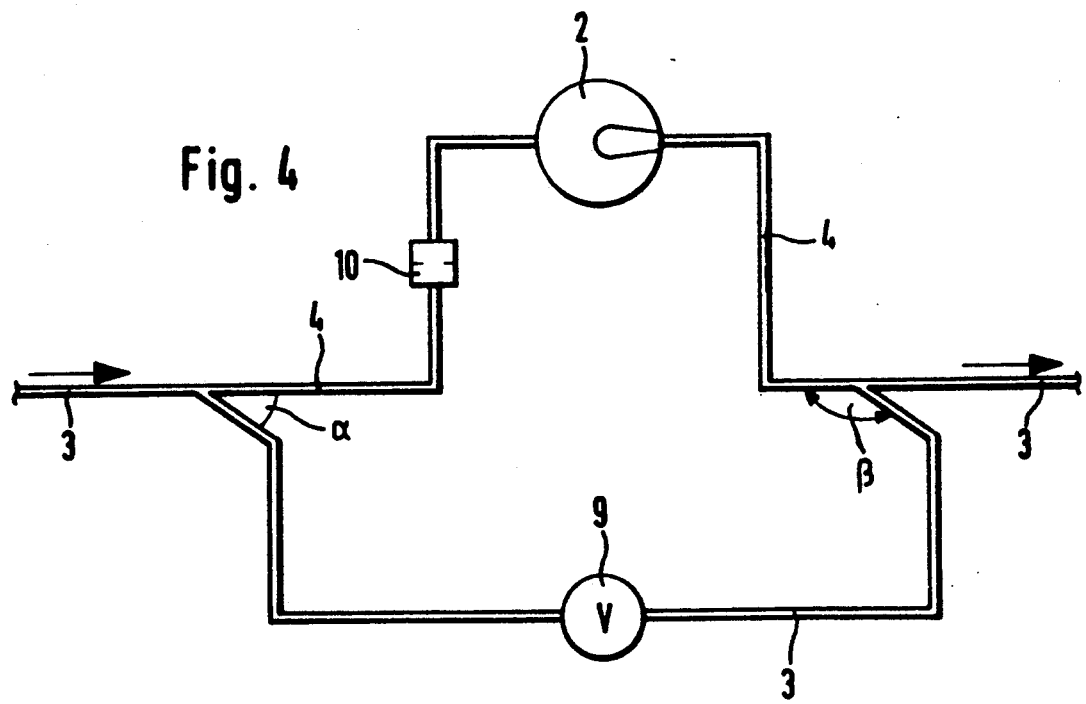

APPARATUS FOR STORING PROPELLANT IN A SATELLITE

FIELD OF THE INVENTION

The invention relates to an apparatus or system for storing a propellant supply in a satellite for use in the propulsion systems of the satellite for a special purpose.

BACKGROUND INFORMATION

Certain earth orbits are preferred for the placement of satellites. For example, the orbit at 800 Km (500 st. mi.) altitude for solar-synchronous polar orbits, or the geo-synchronous orbits for weather and communication satellites at 36,000 Km (22,000 st. mi.). Normally, these satellites contain either a dual mode or single mode propulsion system including an apogee propulsion system and orbit and position control thruster systems. In the dual mode these systems are supplied by a separate propellant tank and by an oxidizer tank. In the single mode the apogee propulsion may use a solid fuel while the control thrusters are supplied by a single substance fuel tank containing, e.g. hydrazine. The propellant is usually stored in surface-tension tanks as is known, for example, from German Patent Publication DE-OS 3,146,262.

The increasing number of active and inactive satellites in these orbits and the requirement for a minimum separation between them for a safe operation leads to a foreseeable lack of suitable orbital positions. The past practice of letting the satellites simply drift away after the end of their useful life does not appear to be acceptable anymore, especially in geo-synchronous orbits which are divided into specific sectors, the utilization of which is assigned to different countries.

A suitable solution to the above described crowding is sending satellites into a higher orbit at the end of the useful life. For this purpose, only a relatively small quantity of propellant is required.

Another problem with the construction of current satellites is the difficulty to accurately determine, after about 10 years of active life, the quantity of propellant still remaining on board. To assure that the satellite can safely be removed from its orbit, it is customary to leave a relatively large remnant of propellant in the storage tanks after the orbital change has been made. This fuel could have been used for the position control and hence, it would have extended the longevity of the satellite if the true filling level of the tanks would be known.

OBJECTS OF THE INVENTION

In view of the above it is the aim of the invention to achieve the following objects singly or in combination:

to provide an arrangement for the supply of propellant to a satellite which optimizes the utilization of the available fuel and still assures that at the end of its useful life the satellite can be removed with certainty from its operationally desired position into a retirement position or rather orbit;

to provide two fuel supply systems, one for the useful life, the other for the removal of the satellite to its retirement orbit;

to use an auxiliary oxidator tank which becomes effective only when the main oxidizer tank has been completely emptied; and to assure that a satellite can be effectively retired out of its operational orbit regardless whether the satellite propulsion system is fuelled in the single or dual mode.

SUMMARY OF THE INVENTION

The propellant supply apparatus of the present invention comprises tanks for separate storage of fuel and oxidizer. With the aid of pressurized gas from a pressure vessel, propellant is fed into lines which lead to the apogee and altitude control thrusters. To assure a sufficient quantity of fuel for the removal of the satellite from its desired operational orbit, the tanks are filled such that when the main oxidizer tank is completely empty at the end of the satellite's useful life, the fuel tank has still enough fuel left for a subsequent orbital correction. An auxiliary oxidizer tank, connected with a by-pass line below or downstream of the main oxidizer tank contains just the right amount of oxidizer required for the lifting of the satellite to its higher retirement orbit.

A gas-bubble sensor, preferably located directly downstream of the main oxidizer tank, is used to determine the emptiness of the main oxidize, tank at the end of useful satellite life for switching on the auxiliary oxidizer tank.

BRIEF DESCRIPTION OF THE DRAWINGS

In order that the invention may be clearly understood, it will now be described, by way of example, with reference to the accompanying drawings, wherein:

FIG. 1 shows a lay-out of a by-pass line with the auxiliary oxidizer tank according to the invention;

FIG. 2 is a variant of the lay-out of FIG. 1;

FIGS. 3a and 3b show the flow conditions of a two-phase flow in an upstream connection of the by-pass line to the oxidizer line; and FIG. 4 is a by-pass line with oblique angle connections.

DETAILED DESCRIPTION OF PREFERRED EXAMPLE EMBODIMENTS AND OF THE BEST MODE OF THE INVENTION

For clarity, the drawing shows the fuel tank only as a block 15a connected to the fuel lines 15 which supply the thrusters 5 and 6 in a manner customary for two-component propellant systems. The thruster 5 provides apogee propulsion. The thrusters 6 provide closed loop position control propulsion.

FIG. 1 shows a surface tension main oxidizer tank 1 which is under pressure from a gas tank 8. The oxidizer flows through line 3 to a gas-bubble sensor 7 which is advantageously placed as close as possible downstream of the main oxidizer tank 1. This position of the bubble sensor 7 assures enough time after gas bubbles have been detected, to close a valve 9 in line 3, thereby terminating the useful life of the satellite.

For initially transporting the satellite into its useful circular orbit around the earth the oxidizer is caused to flow from the oxidizer tank 1, through the bubble sensor 7, through the open valve 9 to the apogee engine or thruster 5 where it is joined and burned with the fuel from the tank 15a. Valves 14 close the lines to the apogee engine or thruster after the satellite has reached its intended useful orbit.

During the useful satellite life propellant is used up through the operation of position control engines or thrusters 6, whereby the oxidizer supply from the main tank 1 is used up first. As soon as the gas-bubble sensor 7 reports the emptiness of oxidizer tank 1, valve 9 in the oxidizer line 3 is closed by conventional means responsive to the sensor 7. The remaining amount of fuel in tank 15a together with the oxidizer in the additional or auxiliary tank 2 is sufficient to move the satellite via its orbital or position control engines 6 into a higher retirement orbit. To this end, valves 11 at the position control thrusters are opened so that gas pressure from tank 8 gets to the auxiliary oxidizer tank 2 through the main oxidizer tank 1, line 3, and by-pass line 4 for causing oxidizer to flow to the position control thruster or thrusters 6.

Examinations have shown that a suitable throttle 10, upstream of the auxiliary oxidizer tank 2 in the by-pass line 4, prevents the premature discharge of the auxiliary oxidizer tank 2. This is so even if through malfunction of the sensor 7, pressurized gas reaches the thrusters 6. It was further shown that in a two-phase flow of oxidizer 13 and gas bubbles 12, the gas bubbles tend to flow in the desirable direction toward valve 9 in the main line 3, provided line 3 leaves the by-pass line 4 at a right angle $\alpha = 90°$ and rejoins line 4 again at a right angle $\beta = 90°$, see FIGS. 1, 3a, and 3b. However, the right angle branching connection between the main line or conduit 3 and the by-pass line or conduit 4 represents a special case. To reinforce the dynamic action of a throttle it is preferable to use smaller angles at the upstream branching connection $\alpha < 90°$, and larger angles at the downstream branching connection $\beta > 90°$, as shown in FIG. 4. Preferably, the angles $\alpha$ and $\beta$ are so selected that auxiliary or additional oxidizer remains in the auxiliary oxidizer tank 2 in case the sensor 7 malfunctions and pressurized gas is being supplied to the propulsion and control thrusters 5, 6. Each of $\alpha$ and $\beta$ can be within the range of 0° to 180°.

In a different embodiment it is possible to connect the by-pass line 4 at right angles to the straight oxidizer line 3 as shown in FIG. 2.

The throttle 10 can be implemented as a simple restriction in the line or conduit 4. However, a pressure baffle, choke, filter or sieve or even a shut-off valve are possible for obtaining the desired flow restriction.

The gas bubble sensor 7 can be of known construction, for example, as a pressure differential sensor, a temperature difference sensor, or an ultrasonic sensor.

The auxiliary oxidizer tank 2 is preferably also a surface tension tank or a membrane tank.

In a system where a single component fuel is used, e.g. hydrazine, the invention uses an auxiliary fuel supply in a respective tank. The auxiliary fuel becomes effective when the normal fuel supply is used up. The auxiliary fuel supply is sufficient for transporting the satellite to its retirement orbit.

Although the invention has been described with reference to specific example embodiments, it will be appreciated that it is intended to cover all modifications and equivalents within the scope of the appended claims.

What I claim is:

1. An apparatus for storing propellant for thruster means in a satellite, comprising a fuel tank (15a) having a capacity for holding fuel sufficient for all normal operations of said thruster means and for transporting said satellite to a retirement orbit when said normal operations are completed, first conduit means (15) connecting said fuel tank (15a) to said thruster means, a first oxidizer tank (1) having a capacity sufficient for said normal operations, second conduit means (3) connecting said first oxidizer tank to said thruster means, a second oxidizer tank (2) for holding an extra supply of oxidizer for transporting said satellite to said retirement orbit, third conduit means (4) including first and second conduit junctions connecting said second oxidizer tank in parallel to a portion of said second conduit means (3), whereby said first junction is upstream of said second oxidizer tank (2) and said second junction is downstream of said second oxidizer tank as viewed in an oxidizer flow direction from said first oxidizer tank (1) to said thruster means, controllable valve means (9) in said portion of said second conduit means (3), and gas bubble sensor means (7) in said second conduit means (3) between said first oxidizer tank (1) and said first junction for producing a control signal in response to said first oxidizer tank (1) being empty for closing said control valve means and for supplying oxidizer from said second oxidizer tank (2) to said thruster means to transport said satellite to said retirement orbit.

2. The apparatus of claim 1, further comprising mixing valve means (11, 14) having first inlet connected to said first conduit means (15), an outlet connected to said thruster means, and a second inlet connected to said second conduit means (3) downstream of said second junction.

3. The apparatus of claim 1, wherein said control valve means (9) in said portion of said second conduit means (3) and said second oxidizer tank (2) form a parallel circuit.

4. The apparatus of claim 19, further comprising throttle means (10) connected in a series connection with said second oxidizer tank (2) in said parallel circuit formed by said control valve means and said series connection.

5. The apparatus of claim 3, wherein said throttle means comprise a shut-off valve.

6. The apparatus of claim 1, wherein said first conduit junction comprises conduit branching means having a first branching angle ($\alpha$) at an upstream inlet end of said second conduit means (3) upstream of said second oxidizer tank (2), and a second branching angle ($\beta$) at a downstream outlet of said second conduit means (3) downstream of said second oxidizer tank (2).

7. The apparatus of claim 6, wherein $\alpha$ and $\beta$ are equal to each other.

8. The apparatus of claim 6, wherein $\alpha$ and $\beta$ differ from each other.

9. The apparatus of claim 6, wherein $\alpha$ and $\beta$ are within the range of 0°0 to 180°.

10. The apparatus of claim 6, wherein $\alpha$ and $\beta$ are so selected that oxidizer remains in said second oxidizer tank (2) if said gas bubble sensor means (7) malfunctions and pressurized gas is being supplied to said thruster means.

11. The apparatus of claim 1, wherein said second oxidizer tank (2) is a surface tension tank.

12. The apparatus of claim 1, wherein said second oxidizer tank is membrane tank.

13. The apparatus of claim 1, wherein said first oxidizer tank (1), said gas bubble sensor means (7), said throttle means (10), and said second oxidizer tank (2) are connected in series with one another if said control valve means (9) are closed.

* * * * *

UNITED STATES PATENT AND TRADEMARK OFFICE
CERTIFICATE OF CORRECTION

PATENT NO. : 5,027,597

DATED : July 2, 1991

INVENTOR(S) : Eduard Soeffker, deceased et al.

It is certified that error appears in the above-identified patent and that said Letters Patent is hereby corrected as shown below:

Claim 2, column 4, line 23, after "having" insert --a--;

Claim 4, column 4, line 32, replace "claim 19" by --claim 3--;

Claim 9, column 4, line 51, replace "0°0" by --0°--;

Claim 12, column 4, line 60, after "is" insert --a--.

Signed and Sealed this

First Day of December, 1992

Attest:

DOUGLAS B. COMER

Attesting Officer     Acting Commissioner of Patents and Trademarks